United States Patent
Yanagihara et al.

(10) Patent No.: US 10,181,672 B2
(45) Date of Patent: Jan. 15, 2019

(54) LID RETAINING STRUCTURE

(71) Applicant: HONDA MOTOR CO., LTD., Tokyo (JP)

(72) Inventors: Shinya Yanagihara, Wako (JP); Yoichi Nishida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 2 days.

(21) Appl. No.: 15/456,850

(22) Filed: Mar. 13, 2017

(65) Prior Publication Data
US 2017/0271805 A1     Sep. 21, 2017

(30) Foreign Application Priority Data
Mar. 15, 2016  (JP) .................... 2016-051328

(51) Int. Cl.
| | |
|---|---|
| *H01R 13/447* | (2006.01) |
| *B62J 11/00* | (2006.01) |
| *H01R 13/73* | (2006.01) |
| *B62J 99/00* | (2009.01) |
| *H01R 13/52* | (2006.01) |

(52) U.S. Cl.
CPC ............ *H01R 13/447* (2013.01); *B62J 11/00* (2013.01); *H01R 13/73* (2013.01); *B62J 99/00* (2013.01); *B62J 2099/004* (2013.01); *H01R 13/5213* (2013.01); *H01R 2201/26* (2013.01)

(58) Field of Classification Search
USPC ............... 248/311.2; 220/737, 793; 224/440; 215/390
See application file for complete search history.

(56) References Cited

U.S. PATENT DOCUMENTS

| | | | | |
|---|---|---|---|---|
| 4,071,175 A | * | 1/1978 | Wagnon .................. | B62J 11/00 224/414 |
| 4,312,465 A | * | 1/1982 | Sinkhorn ................. | B62J 11/00 220/475 |
| 5,752,687 A | * | 5/1998 | Lynch ...................... | B62J 11/00 215/390 |
| 6,104,099 A | | 8/2000 | Mizuta et al. | |

(Continued)

FOREIGN PATENT DOCUMENTS

| | | |
|---|---|---|
| DE | 202012003103 U1 | 6/2012 |
| JP | 2009-40087 A | 2/2009 |

OTHER PUBLICATIONS

Search Report dated Aug. 10, 2017, issued in counterpart European Application No. 17160576.9 (7 pages).

(Continued)

*Primary Examiner* — Terrell L McKinnon
*Assistant Examiner* — Michael McDuffie
(74) *Attorney, Agent, or Firm* — Westerman, Hattori, Daniels & Adrian, LLP

(57) ABSTRACT

A component supporting section of a lid retaining structure is supported on a pipe handle, and a stay is supported on the pipe handle via the component supporting section. A main body portion of a power supply socket is supported on a main body supporting section such that an entrance is located above the main body supporting section of the stay. In the event that a lid that covers the entrance is removed, the lid is retained in a space surrounded by the flat section of the stay, the pipe handle, and the component supporting section.

7 Claims, 5 Drawing Sheets

(56) References Cited

U.S. PATENT DOCUMENTS

| | | | | |
|---|---|---|---|---|
| 6,412,861 B1* | 7/2002 | Herman | ............... | B60N 3/004 |
| | | | | 108/25 |
| 6,719,254 B1* | 4/2004 | Speiser | ............... | A47K 1/09 |
| | | | | 248/311.2 |
| 8,334,671 B1* | 12/2012 | Mosiello | ............... | B62J 11/00 |
| | | | | 320/107 |
| 8,800,830 B2* | 8/2014 | Hoshi | ............... | B62J 11/00 |
| | | | | 224/413 |
| 2005/0121483 A1* | 6/2005 | Barnes | ............... | B62J 11/00 |
| | | | | 224/413 |
| 2006/0086877 A1* | 4/2006 | Cotton | ............... | A01K 97/10 |
| | | | | 248/311.2 |
| 2006/0096987 A1* | 5/2006 | Wry | ............... | A47G 23/0266 |
| | | | | 220/375 |
| 2010/0096398 A1* | 4/2010 | Gorskey | ............... | B65D 47/06 |
| | | | | 220/793 |
| 2014/0001332 A1* | 1/2014 | Sakai | ............... | F16M 13/02 |
| | | | | 248/311.2 |

OTHER PUBLICATIONS

Office Action dated Jul. 25, 2018, issued in counterpart European Application No. 17160576.9 (8 pages).

* cited by examiner

LID RETAINING STRUCTURE

CROSS-REFERENCE TO RELATED APPLICATION

This application is based upon and claims the benefit of priority from Japanese Patent Application No. 2016-051328 filed on Mar. 15, 2016, the contents of which are incorporated herein by reference.

BACKGROUND OF THE INVENTION

Field of the Invention

The present invention relates to a lid retaining structure for a power supply socket through which supply of electrical power is carried out from a vehicle battery to an external device through a power supply terminal and an external terminal, by inserting the external terminal into an entrance of the main body portion, and connecting the external terminal to the power supply terminal of the main body portion, in a state in which a lid is removed from the main body portion.

Description of the Related Art

For example, in Japanese Laid-Open Patent Publication No. 2009-040087, an arrangement of a power supply socket in a storage box at a location directly below a seat on a rear portion of a motorcycle is disclosed.

SUMMARY OF THE INVENTION

In recent years, accessories such as a navigation device, a smart phone, etc. are arranged in the vicinity of a steering handle of a vehicle such as a motorcycle or the like in order to improve visibility of a vehicle occupant with respect to such accessories. In this case, it is desirable to provide a power supply socket in the vicinity of the handle in order to supply electrical power to such accessories from the vehicle battery.

However, with the technique of Japanese Laid-Open Patent Publication No. 2009-040087, supply of electrical power to an external device in the storage box is carried out in a state in which the power supply socket is provided on the side of the storage box, the lid is removed from a top part of the power supply socket that is arranged inside the storage box, and the entrance to the power supply socket is opened. Therefore, the technique of Japanese Laid-Open Patent Publication No. 2009-040087 cannot be applied to a situation in which the power supply socket is arranged in the vicinity of the handle.

The present invention has been devised taking into consideration the aforementioned problem, and has the object of providing a lid retaining structure in which, by suitably arranging the power supply socket in the vicinity of a handle of a vehicle, it is possible for electrical power to be supplied to an accessory arranged in the vicinity of the handle.

The present invention relates to a lid retaining structure for a power supply socket, which is equipped with a main body portion including a power supply terminal configured to supply electrical power from a battery of a vehicle by insertion of an external terminal through an entrance, and a lid configured to cover the entrance.

In addition, in order to accomplish this object, the lid retaining structure according to the present invention includes a handle of the vehicle, a component supporting section configured to support a component of the vehicle on the handle, and a stay configured to support the power supply socket on the handle.

In this case, the handle includes a pipe handle supported steerably on a front portion of the vehicle, and a grip disposed on an end of the pipe handle and which is gripped by an occupant of the vehicle. Further, the component supporting section supports the component on the pipe handle at a location closer to a vehicle body center than the grip. Furthermore, the stay is equipped with at least one supported section supported on the pipe handle, a flat section jointly forming a gap between the pipe handle and the flat section and which extends upwardly from the at least one supported section, and a main body supporting section, which is bent from the flat section so as to separate away from the handle, and configured to support the main body portion.

Further, the main body portion is supported on the main body supporting section so that the entrance is located above the main body supporting section. The lid is connected to the main body portion via a connecting part at a location above the main body supporting section. The lid, which is detached from the entrance, is retained in a space surrounded by the flat section, the pipe handle, and the component supporting section.

In the foregoing manner, according to the present invention, the lid, which is detached, from the entrance, is retained in the space, whereby movement of the lid in an axial direction of the pipe handle (in the left and right direction of the vehicle) is restricted by the component supporting section, together with movement of the lid in the front and rear direction of the vehicle being restricted by the pipe handle and the flat section.

In this case, because the pipe handle has an annular shape when viewed in cross section, in the case that the lid is inserted from above into the gap between the pipe handle and the flat section, the gap is substantially in the form of a V-shape, which is wider at the entrance and narrows in the downward direction. As a result, by holding a distal end (lower end) of the lid, which is most susceptible to swaying, with the pipe handle and the flat section, it is possible to maintain the retained state of the lid favorably while suppressing vibrations of the lid.

In the foregoing manner, according to the present invention, the power supply socket can be arranged in the vicinity of the handle, and the lid can suitably be retained after removal thereof from the entrance. As a result, by inserting the external terminal into the entrance and connecting the external terminal to the power supply terminal, through the power supply terminal and the external terminal, it is possible to supply electrical power from the battery to an accessory (external device) disposed in the vicinity of the handle.

In this instance, the lid and the connecting part preferably are made from elastic members. In accordance with this feature, since the lid and the connecting part are made to be elastically deformed, the lid can easily be arranged in the space surrounded by the flat section, the pipe handle, and the component supporting section. Further, due to surface contact between the lid, which is an elastic member, and the flat section, since the frictional force between the lid and the flat section is increased, the retained state of the lid can favorably be maintained.

In this case, the connecting part connects the main body portion and the lid on a side of the handle, and when the vehicle is viewed from the side, the lid, which is detached from the entrance, is rotated about the connecting part by approximately 270 degrees from the entrance toward the handle, and is held in the space such that the connecting part is positioned above the lid. Consequently, when the lid is held in the gap between the pipe handle and the flat section, the connecting part, which is an elastic member, presses on the lid from above. As a result, it is possible to restrict the position of the lid from any direction, i.e., the front and rear direction, the left and right direction, and the up and down direction.

Furthermore, the component supporting section includes a front support portion arranged in front of the pipe handle and configured to support the component, and a rear support portion disposed behind the pipe handle. In this case, the front support portion, the rear support portion, and the at least one supported section are supported on the pipe handle as a result of being fastened together in a front and rear direction of the vehicle by at least one fastening member.

The fastening members, originally, are members for fixing to the pipe handle the component supporting section that supports the component. Thus, by using the fastening members, the front support portion, the rear support portion, and the supported sections are fastened together in the front and rear direction of the vehicle, whereby the stay can be fixed to the pipe handle while suppressing an increase, in the weight or the handle. Further, by being fastened and fixed in place together with the stay, compared to a case or directly fixing the stay to the pipe handle, the gap is easily formed between the flat section and the pipe handle.

In this case, preferably, the at least one fastening member is provided as a pair of fastening members, while the at least one supported section is provided as a pair of supported sections, and the front support portion, the rear support portion, and the supported sections are supported on the pipe handle as a result of being fastened together in the front and rear direction of the vehicle at locations above and below the pipe handle by using the pair of fastening members. In accordance with this feature, it is possible to suitably fix and support the stay which is elongated in the up and down direction of the vehicle. Further, since the power supply socket can be fixed more firmly to the pipe handle through the stay, it is possible to prevent positional shifting of the power supply socket, which occurs when the external terminal is inserted into the entrance that is arranged above the pipe handle.

Further, the lid includes a lid portion configured to cover the entrance, and a knob portion which protrudes from a side of the lid portion and is thinner than the lid portion. In this case, the lid, which is detached from the entrance, is gripped in the space as a result of the knob portion being arranged in the gap between the pipe handle and the flat section. Consequently, the gap between the pipe handle and the flat section can be made narrower. As a result, it is possible to prevent the power supply socket from protruding in a rearward direction from the pipe handle.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of the lid retaining structure according to the present invention will be described in detail below with reference to the accompanying drawings.
[Schematic Configuration of Motorcycle 12]

Figure 1:
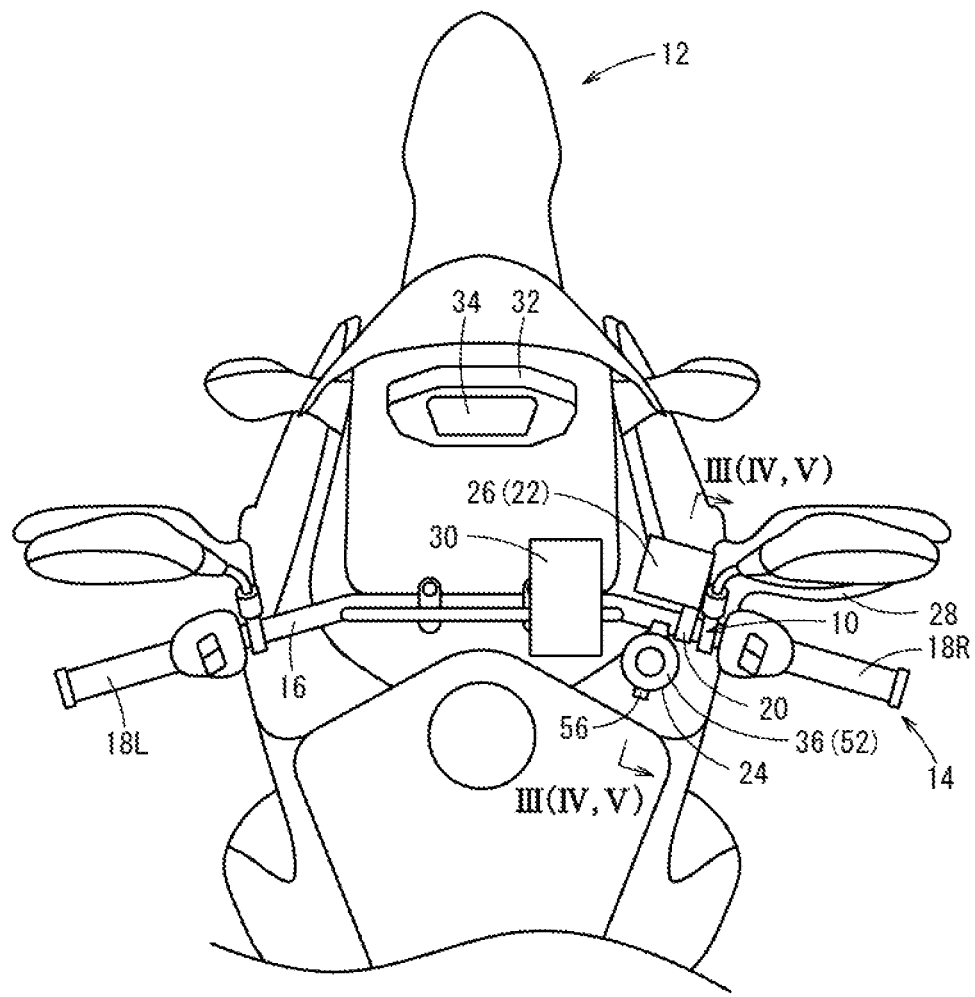
FIG. 1 is a plan view of a front portion of a motorcycle to which there is applied a lid retaining structure according to the present invention.
Figure 1:
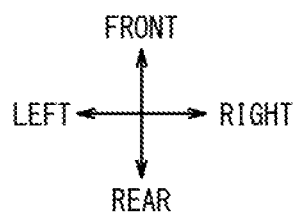
Figure 2:
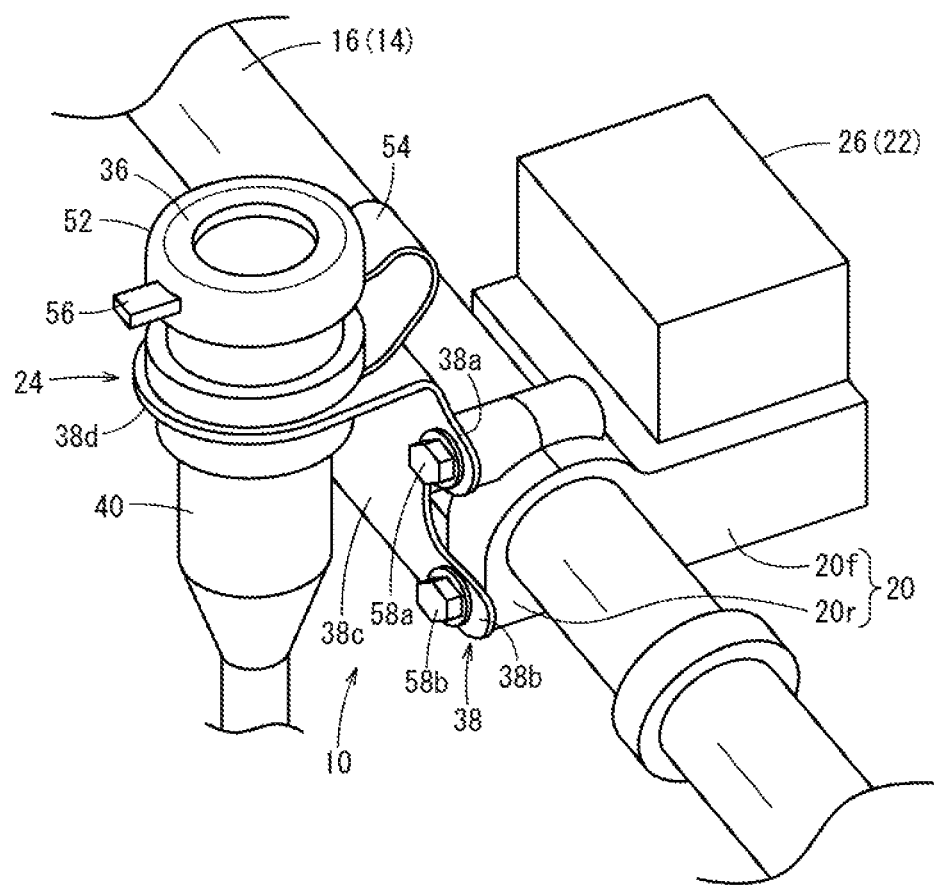
FIG. 2 is a perspective view in which the vicinity around a power supply socket of FIG. 1 is shown at an enlarged scale.
Figure 2:
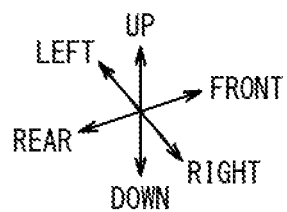
Figure 3:
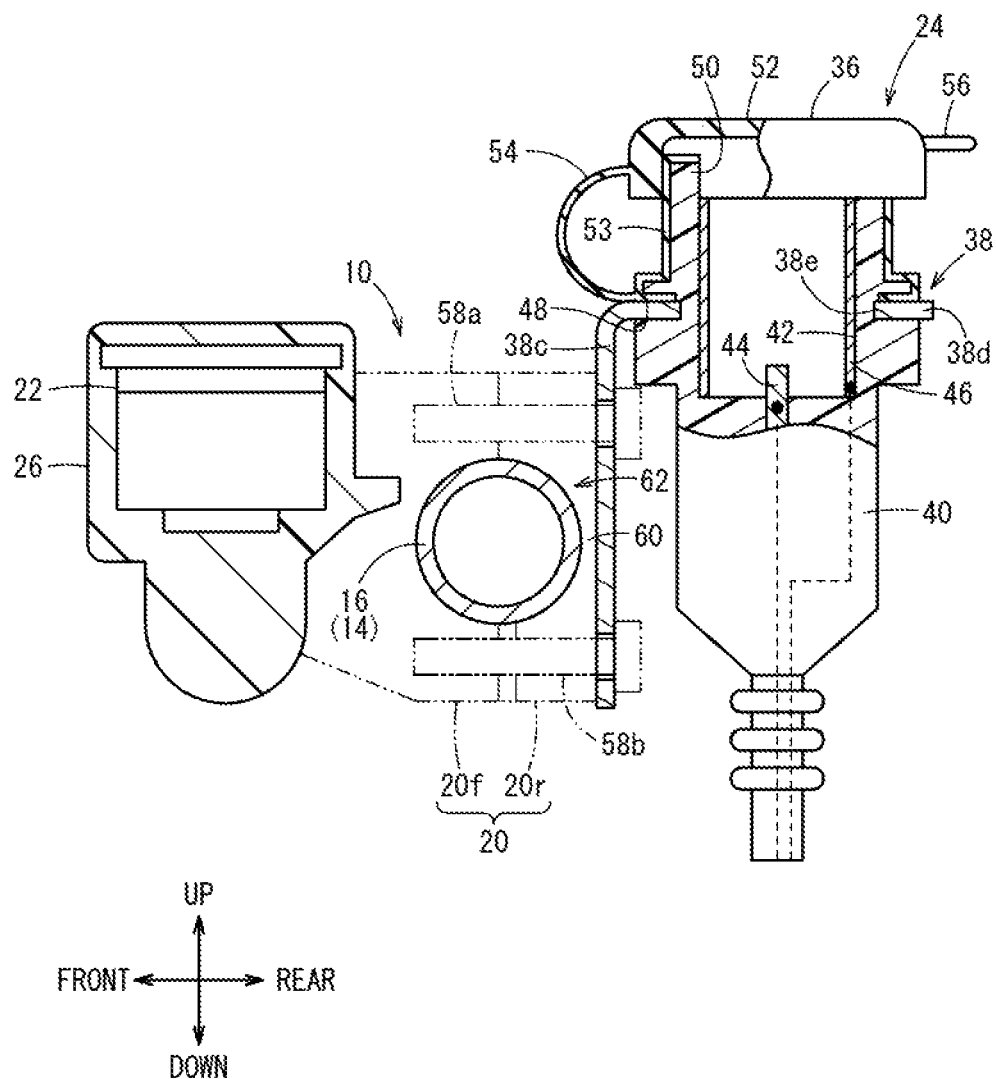
FIG. 3 is a cross-sectional view taken along line III-III of FIG. 1.

As shown in FIGS. 1 through 3, a lid retaining structure 10 according to the present embodiment is applied to a motorcycle 12 which serves as a vehicle.

A handle 14 is provided on a front of the motorcycle 12. The handle 14 is equipped with a steerably supported pipe handle 16, which extends in left and right directions from a vehicle body center at the front of the motorcycle 12, and grips 18L, 18R that are gripped by a rider or a vehicle occupant on both ends of the pipe handle 16.

On the pipe handle 16, a component supporting section 20 is fixedly supported at a position closer to the vehicle body center than the right side grip 18R. The component supporting section 20 supports a master cylinder 22, which is a component of the motorcycle 12, in front of the pipe handle 16, and also supports a power supply socket 24, which is an accessory socket, behind the pipe handle 16. The master cylinder 22 is accommodated in a resin case 26.

A brake lever 28 is supported on the pipe handle 16 in front of the grip 18R, so as to enable connection thereof to the master cylinder 22. When the rider operates the brake lever 28 with the right hand, a brake fluid pressure is applied from the master cylinder 22 to a braking device provided on a non-illustrated front wheel, and a braking force is applied to the front wheel.

In the pipe handle 16, a vehicle-mounted device 30 (external device), which is used in association with an ETC (Electronic Toll Collection) system, is arranged closer to the vehicle body center than the component supporting section 20, the master cylinder 22, and the power supply socket 24. Further, with the motorcycle 12, in order to enhance visibility of the rider who is seated on the seat, a navigation device 32 (external device) is disposed in front of the pipe handle 16. In this case, a screen 34 of the navigation device 32 is arranged at a central position of the vehicle body in front of the pipe handle 16.

Moreover, in FIGS. 1 and 2, constituent elements of the motorcycle 12 (for example, a rearview mirror, a blinker, a front fender, a fuel tank) other than the aforementioned constituent elements are well known, and therefore, detailed description of such elements is omitted.
[Configuration of Lid Retaining Structure 10]

Next, the lid retaining structure 10 according to the present embodiment will be described with reference to FIGS. 1 through 3.

The lid retaining structure 10 is a mechanism for retaining a lid 36 of the power supply socket 24 in the vicinity of the pipe handle 16 of the motorcycle 12, and is constituted by the pipe handle 16, the component supporting section 20, and a stay 38, which is supported on the component supporting section 20 while also supporting the power supply socket 24.

The component supporting section 20 is a metal annular member attached to the pipe handle 16 in surrounding relation to the outer periphery of the pipe handle 16, which also is annular shaped in cross section, and comprises a front support portion 20f disposed in front of the pipe handle 16, and a rear support portion 20r disposed rearwardly of the pipe handle 16. More specifically, when the annular shaped component supporting section 20 is divided in half, the front portion thereof serves as the front support portion 20f, whereas the rearward portion thereof serves as the rear support portion 20r.

The front support portion 20f supports the master cylinder 22 by being formed integrally with the case 26 in which the master cylinder 22 is accommodated. An upper part and a lower part of each of the front support portion 20f and the rear support portion 20r bulge respectively in upward and downward directions, and in such bulging portions, screw holes that extend in front and rear directions are formed, respectively.

The stay 38 is a plate-shaped member made of metal. The stay 38 is equipped with supported sections 38a, 38b, which are capable of being placed in surface contact, respectively, with the rear side of the upper part and the lower part of the rear support portion 20r, a flat section 38c, which is connected to and extends upwardly from the supported sections 38a, 38b, and a main body supporting section 38d, which is bent rearwardly from an upper end of the flat section 38c. Holes of substantially the same diameter as respective screw holes formed in the front support portion 20f and the rear support portion 20r are formed respectively in the supported sections 38a, 38b. Further, a large diameter hole 38e is formed in the main body supporting section 38d.

The power supply socket 24 includes a bottomed cylindrical main body portion 40 and the lid 36. The main body portion 40 includes a power supply opening 42, and a power supply contact 44 (power supply terminal) is provided in an inner part of the power supply opening 42. Further, a ground terminal 46 (power supply terminal) is provided on an inner wall of the power supply opening 42.

A concave/convex stepped portion 48 is formed on the outer periphery of the main body portion 40. A recessed portion of the stepped portion 48 is fitted into the hole 38e of the main body supporting section 38d, whereby the power supply socket 24 is supported on the main body supporting section 38d. As a result, an entrance 50 of the power supply opening 42 is positioned above the main body supporting section 38d.

The lid 36 is a waterproof cover for the power supply socket 24, and includes a lid portion 52 having a flat top surface that closes the power supply opening 42. A location above the power supply opening 42 of the main body portion 40 is covered by an opening side seal member 53 which is formed integrally with the lid 36. The opening side seal member 53 and the lid 36 are connected together through a connecting part 54. Consequently, the front side of the lid portion 52 is supported on the main body portion 40 via the connecting part 54 and the opening side seal member 53. Further, a knob portion 56, the thickness of which is thinner than that of the lid portion 52, is provided on a side portion (distal end) of the lid portion 52 that is located on the rearward side. The lid portion 52, the opening side seal member 53, the connecting part 54, and the knob portion 56 are made up from elastic members such as rubber or the like.

In addition, with the lid retaining structure 10, in a state in which the pipe handle 16 is sandwiched from front and rear directions between the front support portion 20f and the rear support portion 20r, and the main body supporting section 38d supports the main body portion 40, the pairs of screw holes of the front support portion 20f and the rear support portion 20r are aligned respectively with the pair of holes that are formed in the supported sections 38a, 30b, and thereafter screw members 58a, 58b, which serve as a pair of fastening members, are screwed into the respective screw holes through the respective holes, thereby fastening together the front support portion 20f, the rear support portion 20r, and the supported sections 38a, 38b.

In this case, the upper screw member 58a penetrates through the hole of the upper supported section 38a and is screw-engaged with the screw holes on the upper side of the front support portion 20f and the rear support portion 20r. On the other hand, the lower screw member 58b penetrates through the hole of the lower supported section 38b and is screw-engaged with the screw holes on the lower side of the front support portion 20f and the rear support portion 20r.

Consequently, the front support portion 20f, the rear support portion 20r, and the stay 38 are fastened together in the front and rear direction at positions above and below the pipe handle 16, and are supported on the pipe handle 16. Further, as shown in FIGS. 2 and 3, at a location closer to the vehicle body center than the component supporting section 20, in a space surrounded by the pipe handle 16, the component supporting section 20, and the flat section 38c of the stay 38, a gap 60 is formed between the pipe handle 16 and the flat section 38c. That is, a space 62 including the downwardly narrowing substantially V-shaped gap 60 is formed by the pipe handle 16, the component supporting section 20, and the flat section 38c of the stay 38.

Figure 4:
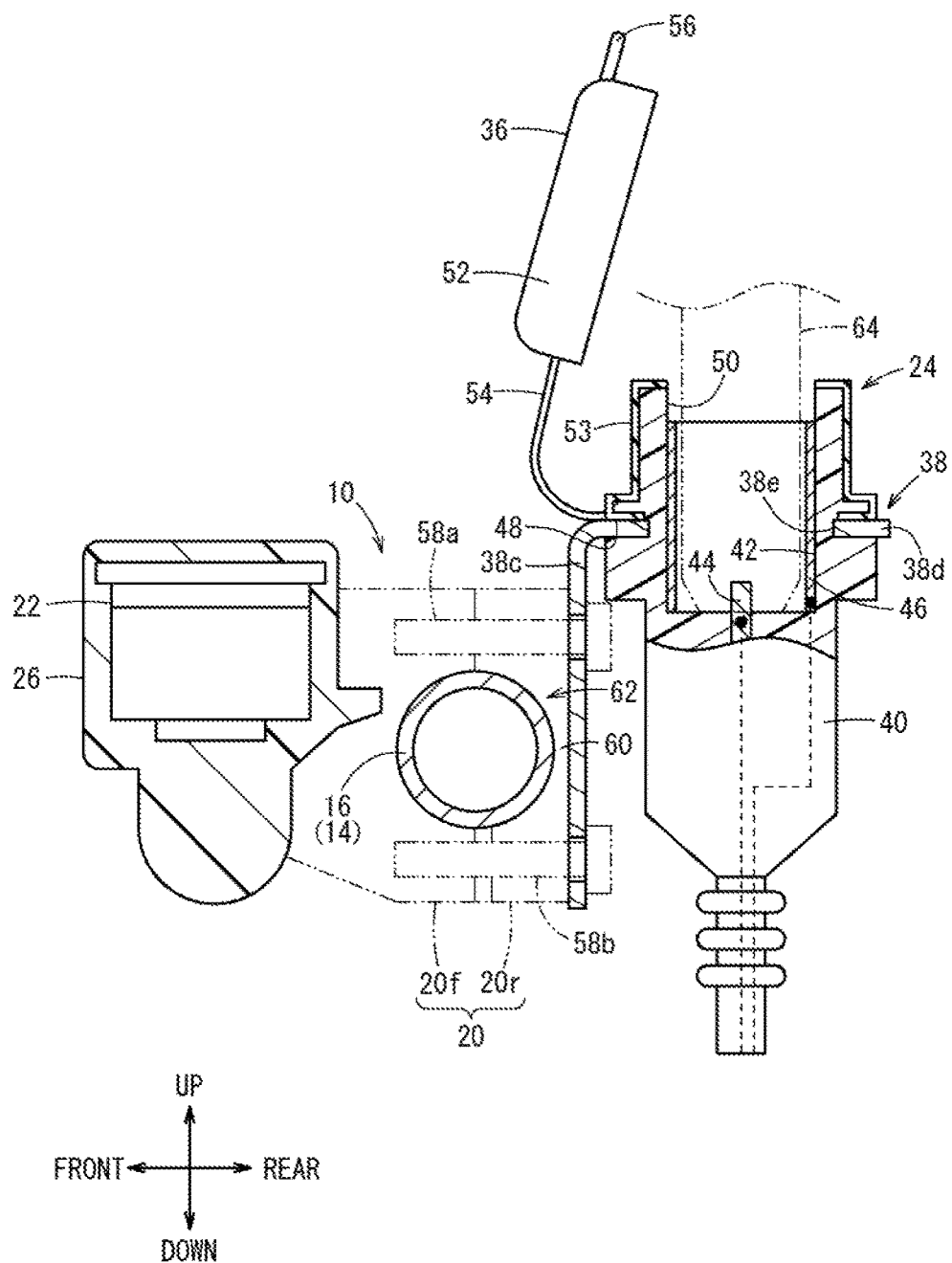
FIG. 4 is a cross-sectional view taken along line IV-IV of FIG. 1.

Next, the rider grasps the knob portion 56 of the lid 36, and by rotating the lid portion 52 about the connecting part 54, the entrance 50 of the power supply opening 42 is exposed to the exterior, as shown in FIG. 4. In addition, after the lid portion 52 is rotated by approximately 270 degrees in a frontward direction from the position (the position of the entrance 50) shown in FIG. 3, the knob portion 56 is directed downward, and the knob portion 56 is inserted into the gap 60 of the space 62. In this case, the lid portion 52 of the lid 36 abuts against the flat section 38c, and by surface contact therebetween, positional shifting is prevented as a result of friction between the lid portion 52 and the flat section 38c. Further, by insertion and sandwiching of the knob portion 56 between the pipe handle 16 and the flat section 38c, the lid 36 is more reliably retained in the space 62.

Because the pipe handle 16 is annularly shaped in cross section, a possibility exists that the component supporting section 20 may rotate, resulting in positional deviation thereof in the circumferential direction of the pipe handle 16. Even in this case, since the gap 60 remains constant between the pipe handle 16 and the stay 38, positional accuracy of the stay 38 with respect to the circumferential direction can be ignored.

Figure 5:
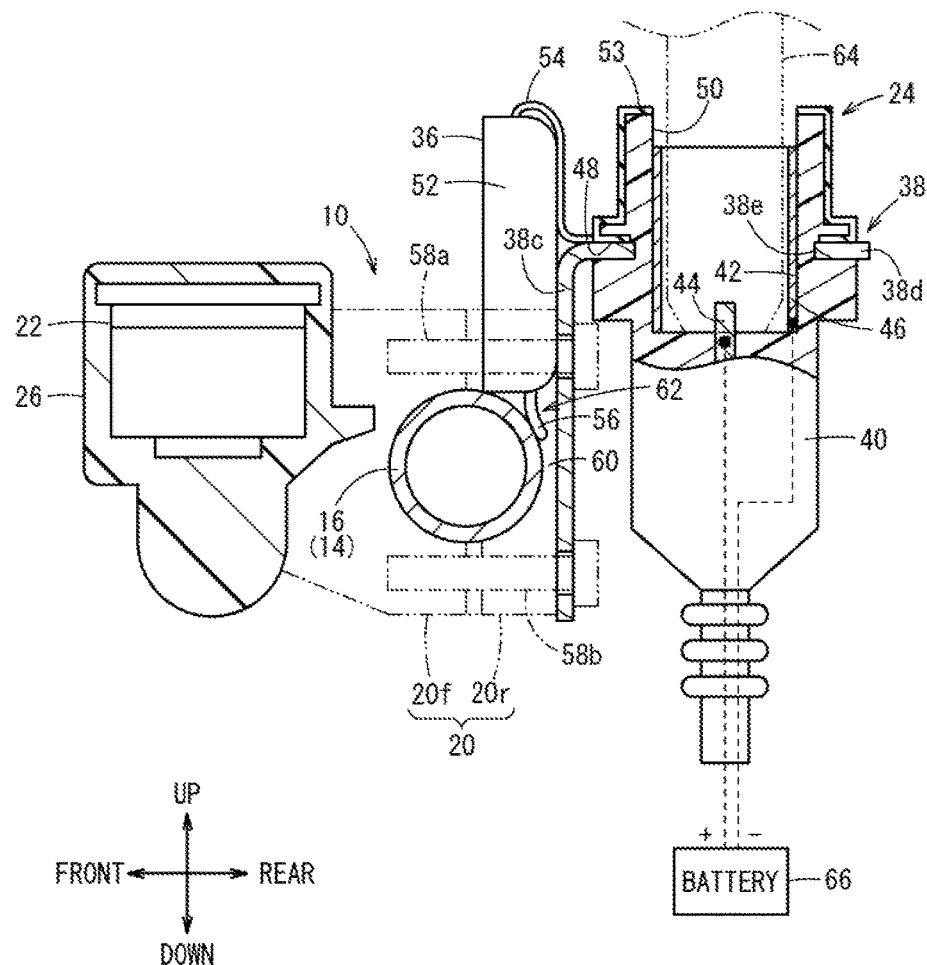
FIG. 5 is a cross-sectional view taken along line V-V of FIG. 1.

Further, as shown in FIG. 5, the location where the lid portion 52 and the connecting part 54 are connected is positioned above the lid 36. Since the lid 36 and the connecting part 54 are elastic members, the lid 36 is pressed from above by the connecting part 54. As a result, the lid 36 can be retained in the space 62.

By opening the entrance 50, a power source terminal 64 of the vehicle-mounted device 30 or the navigation device 32 can be inserted into the power supply opening 42. In this case, the power supply contact 44 is connected to the positive electrode of a battery 66 of the motorcycle 12, and the ground terminal 46 is connected to the negative electrode of the battery 66 thereof. Therefore, when the positive electrode terminal of the power source terminal 64 and the power supply contact 44 are connected, and the negative electrode terminal and the ground terminal 46 are connected, electrical power from the battery 66 can be supplied to the vehicle-mounted device 30 or the navigation device 32 through the power supply contact 44 and the power source terminal 64.

[Advantages and Effects of the Present Embodiment]

As described above, the lid retaining structure 10 according to the present embodiment includes the pipe handle 16, the component supporting section 20, and the stay 38.

The component supporting section 20 supports the master cylinder 22 on the pipe handle 16 at a location closer to the vehicle body center than the right side grip 18R. Further, the stay 38 is equipped with the supported sections 38*a*, 38*b* supported on the pipe handle 16 through the component supporting section 20, the flat section 38*c*, which jointly forms the gap 60 between the pipe handle 16 and the flat section 38*c* and which extends upwardly from the supported sections 38*a*, 38*b*, and a main body supporting section 38*d*, which is bent from the flat section 38*c* so as to separate away from the pipe handle 16, and supports the main body portion 40 of the power supply socket 24.

In addition, the main body portion 40 is supported on the main body supporting section 38*d* such that the entrance 50 is positioned above the main body supporting section 38*d*. Further, the lid 36 is connected to the main body portion 40 via the connecting part 54 at a location above the main body supporting section 38*d*. In this case, the lid 36, which is detached from the entrance 50, is retained in the space 62 surrounded by the pipe handle 16, the component supporting section 20, and the flat section 38*c*.

Consequently, in the lid retaining structure 10, the lid 36, which is detached from the entrance 50, is retained in the space 62, whereby movement of the lid 36 in an axial direction of the pipe handle 16 (in the left and right direction of the motorcycle 12) is restricted by the component supporting section 20, together with movement of the lid 36 in the front and rear direction being restricted by the pipe handle 16 and the flat section 38*c*.

Because the pipe handle 16 has an annular shape when viewed in cross section as shown in FIGS. 3 through 5, in the case that the lid 36 is inserted from above into the gap 60 between the pipe handle 16 and the flat section 38*c*, the gap 60 is substantially in the form of a V-shape, which is wider at the entrance and narrows in a downward direction. As a result, by holding the knob portion 56, which is most-susceptible to swaying, on a distal end (lower end) of the lid 36 with the pipe handle 16 and the flat section 38*c*, it is possible to maintain the retained state of the lid 36 favorably while suppressing vibrations of the lid 36.

In the foregoing manner, according to the present embodiment, the power supply socket 24 can be arranged in the vicinity of the pipe handle 16, and the lid 36 can suitably be retained after removal thereof from the entrance 50. As a result, by inserting the power source terminal 64, which is an external terminal, into the entrance 50 and connecting the external terminal to the power supply contact 44 and the ground terminal 46, through the power supply contact 44 and the ground terminal 46 together with the power source terminal 64, it is possible to supply electrical power from the battery 66 to the vehicle-mounted device 30 and the navigation device 32, which are accessories arranged in the vicinity of the handle 14.

More specifically, with the motorcycle 12, in order to enhance visibility of the rider who is seated on the seat, an external device such as the navigation device 32 or the like is disposed in the vicinity of the pipe handle 16. Thus, according to the present embodiment, the power supply socket 24 is supported on the pipe handle 16, whereby supply of electrical power to the external device from the battery 66 can easily be performed through the power supply socket 24.

Further, if the lid 36 and the connecting part 54 are elastic members, the lid 36 and the connecting part 54 are capable of being elastically deformed, and thus it becomes easy for the lid 36 to be arranged in the space 62 surrounded by the pipe handle 16, the component supporting section 20, and the flat section 38*c*. Further, due to surface contact between the lid 36, which is an elastic member, and the flat section 38*c*, since the frictional force between the lid 36 and the flat section 38*c* is increased, the retained state of the lid 36 can favorably be maintained.

Furthermore, the connecting part 54 connects the main body portion 40 and a front side of the lid 36. In this case, as viewed from the side as shown in FIGS. 3 through 5, the lid 36, which is detached from the entrance 50, is rotated about the connecting part 54 by approximately 270 degrees from the entrance 50 toward the pipe handle 16, and is held in the space 62 such that the connecting part 54 is positioned above the lid 36. Consequently, when the lid 36 is held in the gap 60 between the pipe handle 16 and the flat section 38*c*, the connecting part 54, which is an elastic member, presses on the lid 36 from above. As a result, it is possible to restrict the position of the lid 36 from any direction, i.e., the front and rear direction, the left and right direction, or the up and down direction.

Furthermore, the component supporting section 20 includes the front support portion 20*f* arranged in front of the pipe handle 16 and which supports the master cylinder 22, and the rear support portion 20*r* disposed behind the pipe handle 16. In this case, the front support portion 20*f*, the rear support portion 20*r*, and the supported sections 38*a*, 38*b* are supported on the pipe handle 16 as a result of being fastened together by the screw members 58*a*, 58*b* in the front and rear direction.

The screw members 58*a*, 58*b*, originally, are fastening members for fixing the component supporting section 20 to the pipe handle 16. Thus, by using the screw members 58*a*, 58*b*, the front support portion 20*f*, the rear support portion 20*r*, and the supported sections 38*a*, 38*b* are fastened together in the front and rear direction, whereby the stay 38 can be fixed to the pipe handle 16 while suppressing an increase in the weight of the handle 14. Further, by being fastened and fixed in place together with the stay 38, compared to a case of directly fixing the stay 38 to the pipe handle 16, the gap 60 is easily formed between the flat section 38*c* and the pipe handle 16.

In addition, the front support portion 20*f*, the rear support portion 20*r*, and the supported sections 38*a*, 38*b* are fastened together in the front and rear direction at positions above and below the pipe handle 16, and are supported on the pipe handle 16 using the pair of upper and lower screw members 58*a*, 58*b*. In accordance with this feature, it is possible to suitably fix and support the stay 38 which is elongated in the up and down direction. Further, since the power supply socket 24 can be fixedly supported more firmly on the pipe handle 16 through the stay 38, it is possible to prevent positional shifting of the power supply socket 24 (and falling off of the power supply socket 24 due to the force of inserting the power source terminal 64), which occurs when the power source terminal 64 is inserted into the entrance 50 that is arranged above the pipe handle 16.

Furthermore, the lid 36 includes the lid portion 52 that covers the entrance 50, and the knob portion 56 that protrudes from a rear portion of a side of the lid portion 52 and is thinner than the lid portion 52. In this case, the lid 36, which is detached from the entrance 50, is gripped in the space 62 as a result of the knob portion 56 being arranged in the gap 60 between the pipe handle 16 and the flat section 38c. Consequently, the gap 60 can be made narrower. As a result, it is possible to prevent the power supply socket 24 from protruding in a rearward direction from the pipe handle 16.

A description concerning the present invention has been made above on the basis of a preferred embodiment. However, the technical scope of the present invention is not limited to the disclosed scope and content of the aforementioned embodiment. It should be apparent to those skilled in the art that various modifications or improvements can be made to the above-described embodiment. It is readily apparent from the disclosed content and scope of the appended claims that such modifications or improvements can be included within the technical scope of the present invention. Further, in order to facilitate understanding of the present invention, the reference characters noted in parentheses in the appended claims have been provided in accordance with the reference characters in the accompanying drawings, and the present invention is not to be construed as being limited to such elements to which the reference characters have been attached.

What is claimed is:

1. A lid retaining structure for a power supply socket, which is equipped with a main body portion including a power supply terminal configured to supply electrical power from a battery of a vehicle by insertion of an external terminal through an entrance, and a lid configured to cover the entrance, comprising:
   a handle of the vehicle;
   a component supporting section configured to support a component of the vehicle on the handle; and
   a stay configured to support the power supply socket on the handle;
   wherein the handle comprises a pipe handle supported steerably on a front portion of the vehicle, and a grip disposed on an end of the pipe handle and which is gripped by an occupant of the vehicle;
   the component supporting section supports the component on the pipe handle at a location closer to a vehicle body center than the grip;
   the stay comprises at least one supported section supported on the pipe handle, a flat section jointly forming a gap between the pipe handle and the flat section and which extends upwardly from the at least one supported section, and a main body supporting section, which is bent from the flat section so as to separate away from the handle, and configured to support the main body portion;
   the main body portion is supported on the main body supporting section so that the entrance is located above the main body supporting section;
   the lid is connected to the main body portion via a connecting part at a location above the main body supporting section;
   the lid, which is detached from the entrance, is retained in a space surrounded by the flat section, the pipe handle, and the component supporting section;
   wherein the stay is attached to the pipe handle such that the space is opened to receive the lid;
   wherein the space receives a distal end of the lid; and
   wherein the distal end of the lid is located opposite to a portion of the lid connected to the connecting part.

2. The lid retaining structure according to claim 1, wherein the lid and the connecting part are made from elastic members.

3. The lid retaining structure according to claim 2, wherein:
   the connecting part connects the main body portion and the lid on a side of the handle; and
   when the vehicle is viewed in side view, the lid, which is detached from the entrance, is rotated about the connecting part by approximately 270 degrees from the entrance toward the handle, and is held in the space in a state where the connecting part is positioned above the lid.

4. The lid retaining structure according to claim 1, wherein:
   the component supporting section includes a front support portion arranged in front of the pipe handle and configured to support the component, and a rear support portion disposed behind the pipe handle;
   the front support portion, the rear support portion, and the at least one supported section are supported on the pipe handle as a result of being fastened together in a front and rear direction of the vehicle by at least one fastening member.

5. The lid retaining structure according to claim 4, wherein the at least one fastening member comprises a pair of fastening members, while the at least one supported section comprises a pair of supported sections, and the front support portion, the rear support portion, and the supported sections are supported on the pipe handle as a result of being fastened together in the front and rear direction of the vehicle at locations above and below the pipe handle by using the pair of fastening members.

6. The lid retaining structure according to claim 1, wherein:
   the lid comprises a lid portion configured to cover the entrance, and a knob portion which protrudes from a side of the lid portion and is thinner than the lid portion; and
   the lid, which is detached from the entrance, is gripped in the space as a result of the knob portion being arranged in the gap between the pipe handle and the flat section.

7. The lid retaining structure according to claim 1, wherein an upper part of the space is opened to receive the lid.

* * * * *